US 011583952B2

(12) United States Patent
Deiss et al.

(10) Patent No.: US 11,583,952 B2
(45) Date of Patent: Feb. 21, 2023

(54) PUSHING OUT A PLATE-SHAPED WORKPIECE PART THAT HAS BEEN CUT FREE

(71) Applicant: TRUMPF Werkzeugmaschinen GmbH + Co. KG, Ditzingen (DE)

(72) Inventors: Magnus Deiss, Stuttgart (DE); Peter Epperlein, Leonberg (DE); Jens Ottnad, Karlsruhe (DE); Frank Schmauder, Metzingen (DE); Dennis Wolf, Leonberg (DE)

(73) Assignee: TRUMPF Werkzeugmaschinen GmbH + Co. KG, Ditzingen (DE)

(*) Notice: Subject to any disclaimer, the term of this patent is extended or adjusted under 35 U.S.C. 154(b) by 277 days.

(21) Appl. No.: 16/197,830

(22) Filed: Nov. 21, 2018

(65) Prior Publication Data

US 2019/0091799 A1    Mar. 28, 2019

Related U.S. Application Data

(63) Continuation of application No. PCT/EP2017/062261, filed on May 22, 2017.

(30) Foreign Application Priority Data

May 23, 2016   (DE) .................... 102016208872.6

(51) Int. Cl.
*B23K 26/38*      (2014.01)
*B23K 26/70*      (2014.01)
(Continued)

(52) U.S. Cl.
CPC ............ *B23K 26/083* (2013.01); *B23K 26/38* (2013.01); *B23K 26/702* (2015.10); *B23Q 7/006* (2013.01);
(Continued)

(58) Field of Classification Search
CPC .......... B23Q 7/006; B23Q 7/005; B26D 7/18; B26D 7/1818; B26D 2007/1872;
(Continued)

(56) References Cited

U.S. PATENT DOCUMENTS 4,335,296 A * 6/1982 Bredow ............. B23K 26/0093
                                                  219/121.7
4,452,115 A * 6/1984 Bredow .............. B21D 43/287
                                                      83/157
(Continued)

FOREIGN PATENT DOCUMENTS

CN          1958781 A1     5/2007
CN          103600170 A    2/2014
(Continued)

OTHER PUBLICATIONS

"Calculating a Region or Load's Center of Area: Centroids" by James H. Allen, Mar. 26, 2016, Accessed via web on Feb. 7, 2022: <https://www.dummies.com/article/business-careers-money/careers/trades-tech-engineering-careers/calculating-a-region-or-loads-center-of-area-centroids-192217> (Year: 2016).*
(Continued)

*Primary Examiner* — Lee D Wilson
*Assistant Examiner* — Makena S Markman
(74) *Attorney, Agent, or Firm* — Fish & Richardson P.C.

(57) ABSTRACT

A machine for separative machining of a plate-shaped workpiece that has: a first movement unit for moving the workpiece in a first direction (X); a second movement unit for moving a machining head for the separative machining in a second direction (Y); and two workpiece bearing faces for bearing the workpiece. A gap that extends along the second direction (Y) is formed between the workpiece bearing faces. The machine has a push-out unit having a push-out element, wherein the push-out element is movable
(Continued)

at least in the second direction (Y) within the gap so as to press, at a predefined push-out position (AP), against a workpiece part that was cut free from the workpiece during separative machining. The disclosure further relates to methods for pushing out a workpiece part which, in particular, was cut free on such a machine.

14 Claims, 3 Drawing Sheets (51) Int. Cl.
 B26D 7/18 (2006.01)
 B23Q 7/00 (2006.01)
 B23K 7/00 (2006.01)
 B23K 26/08 (2014.01)

(52) U.S. Cl.
 CPC ............ B26D 7/18 (2013.01); B26D 7/1818 (2013.01); B23K 7/002 (2013.01); B26D 2007/189 (2013.01); B26D 2007/1872 (2013.01); Y10T 29/5377 (2015.01); Y10T 29/53739 (2015.01)

(58) Field of Classification Search
 CPC ......... B26D 2007/189; Y10T 29/53739; Y10T 29/53743; Y10T 29/53748; Y10T 29/5377; B23K 26/083; B23K 26/38; B23K 26/702; B23K 26/002
 See application file for complete search history.

(56) References Cited

U.S. PATENT DOCUMENTS

| 4,797,531 | A | | 1/1989 | Otto et al. | |
|---|---|---|---|---|---|
| 5,880,429 | A | * | 3/1999 | Katayama | B21D 28/12 700/166 |
| 5,889,675 | A | * | 3/1999 | Minami | B26D 5/007 700/213 |
| 6,826,989 | B1 | * | 12/2004 | Wattles | A22C 17/0093 83/102 |
| 7,011,007 | B2 | * | 3/2006 | Stein | B26D 9/00 83/552 |
| 7,659,490 | B2 | * | 2/2010 | Beilke | B21D 28/265 219/121.67 |
| 7,899,575 | B2 | * | 3/2011 | Kilian | B23K 26/083 72/21.4 |
| 7,992,475 | B2 | * | 8/2011 | Buettner | B21D 35/003 219/121.72 |
| 8,217,301 | B2 | * | 7/2012 | Schmauder | B23K 26/38 219/121.67 |
| 9,039,485 | B2 | | 5/2015 | Maurer | |
| 9,700,962 | B2 | | 7/2017 | Yang et al. | |
| 10,016,907 | B2 | * | 7/2018 | Song | B26F 1/40 |
| 10,220,469 | B2 | * | 3/2019 | Yamashita | B23Q 3/15766 |
| 2003/0066574 | A1 | * | 4/2003 | Lovchik | B27M 1/06 144/382 |
| 2009/0003952 | A1 | * | 1/2009 | Schmauder | B23K 26/02 409/183 |
| 2009/0010731 | A1 | * | 1/2009 | Heusel | B21D 45/003 409/199 |
| 2015/0027999 | A1 | * | 1/2015 | Yamaguchi | B23K 37/08 219/121.44 |
| 2016/0297033 | A1 | * | 10/2016 | Imaya | B23K 26/16 |
| 2016/0297036 | A1 | | 10/2016 | Schmauder et al. | |

FOREIGN PATENT DOCUMENTS

| CN | 103869750 A | 6/2014 |
|---|---|---|
| CN | 105473272 A | 4/2016 |
| DE | 134 198 | 10/1901 |
| DE | 31 35 266 | 3/1983 |
| DE | 81 25 908 | 10/1984 |
| DE | 36 37 204 | 5/1988 |
| DE | 10 2004 059 766 | 6/2006 |
| DE | 10 2011 051 170 | 12/2012 |
| DE | 10 2013 226 818 | 7/2015 |
| JP | H04 231192 | 8/1992 |
| JP | 04371383 | 12/1992 |
| JP | 05305544 | 11/1993 |
| JP | 06170469 | 6/1994 |
| JP | H08002670 | 1/1996 |

OTHER PUBLICATIONS

Merriam Webster: Definition of a Centroid (Year: 2016).*
JP Office Action in Japanese Appln. No. 2018-561491, dated Jan. 14, 2020, 12 pages (with English translation).
Boge et al.: "Aufgabensammlung zur Statik, Dynamik Hydraulik und Festigkeitslehre," Dec. 1965, pp. 50-51 (with English translation).
International Search Report and Written Opinion in International Application No. PCT/EP2017/062261, dated Aug. 28, 2017, 25 pages (with English translation).
JP Decision to Grant in Japanese Appln. No. 2018-561491, dated Sep. 28, 2020.
Boge et al., "Aufgabensummlung Zur Statik, Dynamik Hydraulik und Festigkeitslehre," Viewegs Fachbuecher fuer den Technik, 1965, 46-61.
CN Office Action in Chinese Appln. No. 201780045655.2, dated Jul. 1, 2020, 25 pages (with English translation).
CN Search Report in Chinese Appln. No. 201780045655.2, dated Jun. 8, 2020, 2 pages.

* cited by examiner

PUSHING OUT A PLATE-SHAPED WORKPIECE PART THAT HAS BEEN CUT FREE

CROSS REFERENCE TO RELATED APPLICATIONS

This application is a continuation of and claims priority under 35 U.S.C. § 120 from PCT Application No. PCT/EP2017/062261 filed on May 22, 2017, which claims priority from German Application No. DE 10 2016 208 872.6 filed on May 23, 2016. The entire contents of each of these priority applications are incorporated herein by reference.

TECHNICAL FIELD

The present invention relates to a machine, in particular a laser processing machine, for separative machining of a plate-shaped workpiece, and to pushing out a workpiece part that has been cut free during separative machining in particular on such a machine.

BACKGROUND

Machines for separative machining of a plate-shaped workpiece have been disclosed in DE 10 2013 226 818 B4. On a machine of this type having a hybrid motion control in which the workpiece is moved in a first direction (X-direction) and the machining head is moved in a second direction (Y-direction), the workpiece bearing is interrupted in the displacement range of the machining head in order for damage by the processing beam (laser beam) to be avoided. A gap in the Y-direction thus extends in the workpiece bearing between two workpiece bearing faces, or workpiece bearings, respectively. The processing beam that has penetrated the workpiece and any slag and cutting waste that arises is discharged through said gap. The processing beam can be a laser beam, but the use of another type of high-energy beam, for example in the form of a plasma arc or of a water jet, is also possible.

It is proposed in DE 10 2013 226 818 B4 that at least two support slides that are displaceable in a mutually independent manner in the second direction are disposed within the gap, said to support slides having in each case one bearing face for supporting workpiece parts that are cut during separative machining.

A laser processing machine in which the laser processing head for removing a cut-free workpiece part from the sheet skeleton is lowered such that the end of said laser processing head that faces the workpiece, collides with the cut-free workpiece part so as to push out the latter downward from the sheet skeleton has been disclosed in JPH04231192 A. A rod-type tool which is disposed beside the machining head can also be lowered onto the workpiece in order for the cut-free workpiece part to be pushed out from the sheet skeleton.

A turret cutting press which has a laser station for cutting out parts from a workpiece and which interacts with a push-out unit that is fastened to the base frame of the cutting press is described in DE 36 37 204 A1. The push-out unit is composed substantially of a push-out plate which is lowerable in a vertical manner and is pivotable into the intermediate space between the laser head and a laser shaft. The push out procedure is performed in that the push-out plate is placed onto the workpiece so as to push the part downward out of the (residual) workpiece. The laser shaft is lowered when pushing out, such that the part is removed from the plane of the workpiece and can be removed from the operating range of the cutting press without the workpiece having to be moved out of the operating range for this purpose.

A combined machining device for forming a hole in a plate-shaped workpiece by thermal cutting by means of a first head and machining by means of a second head is described in US 2015/0027999 A1, wherein the heads are movable in the horizontal and the vertical direction relative to a bearing table for the workpiece. The second head can have a cutting tool for carrying out a final processing procedure on the hole which has been generated in a previous hole-cutting procedure by thermal processing with the first head. The cutting tool that is used in the final processing procedure can be introduced into the hole between the hole cutting procedure and the final processing procedure so as to check whether or not thermally cut material has remained in the hole.

A separating device for separating workpiece parts from a sheet skeleton is described in JPH082670 A, in which separating device a plurality of push-out elements are pressed against the upper sides of cut-free workpiece parts. The workpiece parts are lowered for separating a workpiece part from the sheet skeleton, wherein the push-out elements when lowering are pressed against the workpiece parts in order for a horizontal alignment to be maintained.

SUMMARY

One of the objects of the present disclosure is to provide a machine, in particular a laser processing machine, for separative machining of a plate-shaped workpiece, said machine having an improved process reliability when discharging workpiece parts.

This object is achieved by a machine of the type mentioned at the outset, further including: a push-out unit having a push-out element, wherein the push-out element is movable at least in the second direction within the gap so as to press against a workpiece part, which was cut free from the workpiece during separative machining, at a predefined push-out position. The push-out position should be chosen in such a manner that the risk of canting is as small as possible.

In order for a reliable retrieval of small workpiece parts from the sheet skeleton that are discharged through the gap, it is proposed that a push-out unit, e.g. in the form of a push-out piston, that has a push-out element be positioned at a predefined push-out position within the gap. The push-out element, e.g. in the form of a push-out rod, is pressed against the upper side of the cut-free workpiece part at the predefined push-out position, so as to push out the workpiece part downward from a workpiece bearing plane that is formed by the workpiece bearing faces of the machine. The push-out unit in this way reduces the possibility of tilting of the workpiece part by virtue of friction forces and the associated therewith risk of canting of the workpiece part on the sheet skeleton, said risk increasing sharply as the thickness of the workpiece (metal sheet) increases. The machine can be a machine for mechanically separating the workpiece, for example a punching machine or a combined punching/laser machine. The machine can be configured for separative machining by means of a high-energy beam, in particular by means of a laser beam, which is aligned onto the workpiece by the machining head. Instead of a laser beam, the high-energy beam can be a plasma arc, for example.

A workpiece bearing face (or workpiece bearing support) in the context of this application is understood to be a workpiece bearing which is suitable for supporting the plate-shaped workpiece in a planar manner. Such a workpiece bearing face does not have to form a continuous face, rather it is sufficient for the workpiece to be supported at a plurality (for example three, typically significantly more) locations by bearing elements (optionally only in a punctiform manner), in order for the workpiece to be mounted in a bearing plane. The workpiece bearing face in this case is formed by the upper sides of one or more bearing elements of the machine. The stationary workpiece bearing faces between which the gap is formed can be configured in the form of a brush table or ball table, for example. The workpiece to be processed in this case is supported during the machining by way of many bearing elements in the form of brushes or (rotatable) balls which are disposed on or in, respectively, a table face and which collectively form the workpiece bearing face. Alternatively, rotatable rollers can be provided as bearing elements in order to form workpiece bearing faces. Moreover, it is possible for the workpiece bearing faces to be designed as revolving bearing belts.

The push-out element of the push-out unit typically has a comparatively small contact face by way of which said push-out element is pressed against the cut-free workpiece part, wherein the center of area, or the center of the contact face of the push-out element is positioned at the push-out position. In order for the push-out position in the gap to be able to be predefined in a practically arbitrary manner, the push-out element, optionally conjointly with the push-out unit, is preferably movable both in the first direction (X) as well as in the second direction (Y) within the gap. In one embodiment the machine has a third movement unit (or movement drive) for moving the machining head in the first direction (X) within the gap, and the push-out element is movable (in a controlled manner) within the gap by means of the second movement unit (or movement drive) and third movement unit, which serve for moving the machining head in the gap. In this way, the push-out element can be positioned at a predefined push-out position within the gap without the workpiece having to be moved for this purpose.

The push-out unit can be fastened to the machining head, for example be attached laterally to the machining head. In this way, the push-out unit can be positioned in the first direction and/or in the second direction in the gap by the movement of the machining head. The push-out unit is therefore typically freely positionable in the movement range of the machining head, said movement range in the Y-direction optionally reaching beyond the extent of the gap. The push-out unit and thus the push-out element in this instance is positionable along the gap (in the Y-direction) across the entire operating range, as well as transversely to the gap (in the X-direction) in the movement range of the additional axis that is formed by the third movement unit, the latter movement range potentially being for example approximately +/−50 mm.

In some embodiments, the push-out unit is configured for moving the push-out element between a first retracted position in which the push-out element does not project beyond an end of the machining head that faces the workpiece, and a second extended position in which the push-out element projects beyond the end of the machining head that faces the workpiece. The push-out element in the first retracted position can be conjointly moved with the machining head during the cutting process, without contacting the surface of the workpiece. The push-out element in the second extended position projects downward beyond an end of the machining head that faces the workpiece, for example beyond a nozzle edge of a machining nozzle attached there, so as to enable the pushing-out the cut-free workpiece part.

The machine additionally usually includes a fourth movement unit for moving the machining head in a third direction, specifically the direction of gravity, that can be aligned so as to be perpendicular to the first and the second direction. The movement of the machining head in the third direction serves for setting the spacing between the workpiece and the machining head in the third direction. If the push-out unit is fastened to the machining head, said push-out unit can be moved conjointly with the machining head in the third direction, thus being displaceable in terms of height.

In the context of this application, a movement which is enabled by a respective movement unit in an associated direction is understood to be a bidirectional movement (reciprocal movement), that is to say a movement in the positive as well as in the negative direction. For example, the first and the third movement units are configured for moving the workpiece and the machining head, respectively, in a bidirectional manner in the first direction (X-direction), that is to say configured for moving the workpiece and the machining head, respectively, in the positive as well as in the negative X-direction. In an analogous manner, the second movement unit is also configured for moving the machining head in a bidirectional manner in the second direction (Y-direction), which can be perpendicular to the first direction, that is to say for moving the machining head in the positive as well as in the negative Y-direction. The same applies to the fourth movement unit, which is configured for moving the machining head in a bidirectional manner in the third direction (Z-direction), or in the direction of gravity, respectively.

In some embodiments, the push-out element in the second position (i.e., the second extended position) is actuatable, or the push-out element is mounted in a resilient manner. In principle, there are two possibilities in order for the push-out element to be pressed against the workpiece: either the push-out element is actuatable or lockable in the second position, such that said push-out element when pressed against the workpiece is not pushed out of the second position, or the push-out element is mounted in a resilient manner such that said push-out element when pressed against the workpiece part is moved counter to the impact of the spring force from the second position in the direction toward the first retracted position.

The push-out unit can be configured as a push-out cylinder, the piston rod of the latter forming the push-out element. In this case, the piston rod can be moved, for example in a motorized or pneumatic manner, between the two positions (i.e., the first retracted position and the second extended position), said two positions typically being the two terminal positions of the movement of the piston rod. The push-out element in the form of the piston rod in the second extended (extracted) position is pressed against the workpiece, or against the upper side of the latter. If the piston rod is driven in a motorized manner, said piston rod is typically rigidly mounted, that is to say said piston rod when pressed against the workpiece remains in the second position. Alternatively, the piston rod when pressed against the workpiece can be moved counter to the effect of a spring force.

The push-out cylinder can be pneumatically operated. In this case, a (pneumatic) resilience is typically caused by the compressive capability of the gas, for example compressed air, used for the movement of the piston rod, that is to say the piston rod in the second extended position is forced inward after landing on the workpiece, such that the piston rod departs from the second completely extended position but nevertheless exerts a force on the cut-free workpiece part.

In one embodiment the machine includes at least one support slide which is displaceable in the second direction within the gap and which has a bearing face for supporting the workpiece parts that are cut during separative machining, wherein the support slide and/or the bearing face is/are moveable (in the third direction) relative to the support slide below a workpiece bearing plane that is formed by the workpiece bearing faces. As is described in DE 10 2013 226 818 B4 mentioned at the outset, which is incorporated in the content of this application by reference, a workpiece part that bears on the bearing face, or on the bearing faces, can be ideally released from the residual workpiece without canting on account of the controlled lowering of the bearing face(s), or of the support slide(s) conjointly with the bearing faces, respectively.

In the present embodiments, it can be achieved on account of the flexibly positionable push-out element in conjunction with a hard and rigid construction of the support slides, more specifically of the bearing faces of the latter, that the cut-free workpiece part in a push-out procedure in which the bearing faces, or the support slides, are moved downward, is pressed against the bearing face and is fixed in a horizontal position by a pretensioning, or a pressure, respectively, from above on the push-out element. Said fixing is maintained during the entire lowering procedure, this enabling friction forces that arise on the circumference of the cut-free workpiece part to be overcome without the workpiece part tilting or catching on the residual workpiece.

For this purpose, the bearing face of the support slide has a (part-) region which forms a rigid bearing, and the support slide and the push-out element are positionable relative to one another in such a manner that the push-out position is capable of being disposed in that region of the support slide that has the rigid bearing. That region of the bearing face that forms the rigid bearing can, for example, include a compression-resistant material, for example a rigid or hard surface from copper, forming a counter bearing against the impact of the push-out element. It is understood that the bearing face of the support slide, in addition to the rigid (part-) region, can optionally have a further part-region that forms an elastic bearing, or a bearing that is capable of being deformed when a force is applied, for example in the manner of a brush bearing which supports the workpiece, or the workpiece part bearing thereon in a scratch-free manner. Alternatively, the bearing face can be composed of only that region that forms the rigid bearing.

If the push-out element is locked in the second position, said push-out element is placed onto the upper side of the cut-free workpiece part and is pressed against the workpiece part such that the latter is clamped in the manner of a vise between the push-out element and that region of the bearing face that forms the rigid bearing. If the push-out element is mounted in a resilient manner in the second position, the push-out element is likewise placed onto the upper side of the cut-free workpiece part and is moved counter to the effect of the spring force from the second position in the direction toward the first position until a sufficient mechanical tension is present between the push-out element and that region that forms the rigid bearing of the bearing face, such that the workpiece part is braced against the surface of the bearing face of the support slide. The support slides, while maintaining the pressure, or the pretensioning, are subsequently lowered. On account thereof, the fixing of the workpiece part can be maintained during the entire lowering movement. Alternatively it is also possible for the push-out unit to be likewise lowered (for example in a synchronous manner) by a specific distance so that the pretensioning is maintained.

In one refinement, an extent of that rigid bearing region in the first direction corresponds to the extent of a movement range of the machining head in the first direction. It is ensured in this way that the push-out element at any arbitrary push-out position can at all times be disposed above that region of the bearing face that forms the rigid bearing. It is understood that the push-out position optionally (that is to say in the case of a workpiece part that is sufficiently flexurally rigid) can also be chosen to be between two support slides, as long as the workpiece part when pushing out bears on the bearing faces of both support slides and is supported by both bearing faces.

In one refinement, the machine has two support slides that are displaceable within the gap, the bearing faces of said support slides on the mutually facing edges thereof having in each case one region that forms the rigid bearing (rigid bearing region). This enables a push-out position which lies between the two support slides to be chosen, since the two (part-) regions that in this case are formed on the mutually facing edges form a counter bearing for the push-out element. The flexibility in terms of the choice of push-out position is thus increased, and the pushing-out of comparatively large workpiece parts is thus enabled.

In one refinement, the edges of the bearing faces are aligned at an angle in relation to the first direction and to the second direction. It has been demonstrated that a majority of workpieces made on a machine for separative machining of plate-shaped workpieces, for example a flat-bed laser machine, have approximately rectangular external dimensions and an approximate alignment of the internal contours thereof at an angle of 0° or 90° in relation to the respective external edges of the rectangular or square plate-shaped workpiece. If the two edges of the bearing faces are aligned at an angle (different from)90° in relation to the first or to the second direction, this enables an improved support of the workpiece parts that, for example, have long tongue-type portions in the first direction. The mutually facing edges of the bearing faces of the two support slides can run at an angle between 20° and 40° in relation to the first direction, for example. The rigid regions that adjoin the edges that are aligned at an angle, can be configured in a stripe-shaped manner. With the exception of that portion that forms the edge, the external contour of the stripe-shaped regions can run so as to be in particular parallel with the first direction, or parallel with the second direction.

In some embodiments, the push-out unit has at least one sensor for detecting the attainment of the second extended position by the push-out element, and/or for detecting any contact between the push-out element and the surface of the cut-free workpiece part. The push-out element, or the push-out unit, can in this way advantageously be additionally used as a sensor for checking whether the workpiece part has actually been discharged. For this purpose, a loss of contact between the push-out element and the surface of the cut-free workpiece part can be detected in the case of a push-out element that is actuated in the second position. Alternatively, in the case of a push-out element that is mounted in a resilient manner in the second position, the attainment of the second position or the departure therefrom can be detected for this purpose, as will be described in more detail hereunder.

In some embodiments, the machine additionally includes a control unit (or controller) that is configured, or programmed, for predefining the push-out position so as to depend on a geometry, in particular on an external contour, of the cut-free workpiece part. In the case of the push-out procedure it is important for the push-out position of the push-out element to be chosen in a suitable manner. The friction on the circumference of the workpiece part, or on the external contour of the latter, is the decisive criterion for the choice of the best push-out position of the push-out element on the workpiece part to be pushed out. Consequently, it is advantageous to press against the workpiece part close to potential problematic locations, since in this way the influence of force of the push-out element is improved by a shortened lever arm.

If the support slides described above are present, the control unit also serves for displacing the support slides in a controlled manner in the gap. The positioning of the support slides can be performed in a synchronous manner with the movement of the machining head in the second direction (Y-direction). The movement of the support slides can however also be performed independently of the movement of the machining head in the Y-direction. In this way, for example when cutting large workpiece parts does not need the support slides, the support slides can be disposed so as to be spaced apart from the machining position at which the processing beam is positioned, and for example be moved to a parking position outside the movement range of the machining head. If the support slides are required for supporting workpiece parts that are at risk of tilting, said support slides can be disposed so as to be mutually adjacent and neighboring the machining position.

In one refinement, the control unit in the case of a cut-free workpiece part in which the center of mass or the center of area of an area that is surrounded by the external contour of the cut-free workpiece part deviates from the centroid of the cut-free workpiece part, more specifically deviates from the centroid of the external contour line of the cut-free workpiece part, is configured to predefine a push-out position which coincides with the centroid of the external contour line or is offset from the center of area or from the center of mass of the cut-free workpiece part in a direction toward the centroid of the contour line of said cut-free workpiece part. In the case of plate-shaped workpieces that are formed from a typically metallic material having a constant thickness without internal contours (holes or openings), the center of area of the area that is surrounded by the external contour of the cut-free workpiece part corresponds to the center of mass of the workpiece part. In the case of the cut-free workpiece part which has internal contours or holes, the center of area of the area that is surrounded by the external contour typically deviates from the center of mass since the area that is surrounded by the external contour and also includes the area in the cut-free workpiece that is formed by the internal contours or the holes. The center of area of the area that is surrounded by the external contour, or the center of area in general, in the present application is understood to mean that center of area in the calculation of which internal contours of the workpiece part that are optionally present have not been considered; that is to say that the center of area is calculated as if the internal contours were not present, since the internal contours are typically not relevant to the problem pertaining to the likelihood of the workpiece part catching on the residual workpiece by way of the external contour of said workpiece part.

The centroid in the case of workpiece parts having simple external contours can coincide with the center of mass; in the case of complex and asymmetrical workpiece parts the position of the centroid typically is displaced towards the critical complex part-contours. As has been described above, it is advantageous to press against the workpiece part close to potential problematic locations, since the influence of force, or the lever arm, respectively, is improved in this way. In analogous manner, the push-out element in the case of workpiece parts having external contours with complex part-regions preferably acts on the workpiece part at a push-out position that is closer to the complex part-region than the center of mass of the workpiece part. Therefore, the push-out position is typically chosen in that part-region of the workpiece part between the calculated center of area—without taking into account internal contours—or the center of mass and the external contour line in which the centroid is also located. When critical part-regions are present at various locations of the external contour of the workpiece part, the linear centroid represents a compromise in terms of the most suitable push-out position.

The push-out position can in particular coincide with the centroid of the workpiece part in as far as workpiece material against which the push-out element can press is provided there. If this is not the case, the push-out position can be offset to the nearest position where workpiece material is actually located. The centroid, the center of mass, and the center of area of the cut-free workpiece part can be determined or calculated, in the control unit; however, it is also possible that the data pertaining to the centroid, to the center of mass, or to the center of area, is made externally available to the control unit conjointly with the contour data of the workpiece part, such that such a calculation in the machine itself can be dispensed with.

In some embodiments, the control unit for pushing-out a cut-free workpiece part is configured for positioning the push-out element and the support slides relative to one another in such a manner that either the bearing face of one of the two support slides, more specifically at least one region of the bearing face that forms a rigid bearing, is disposed at the push-out position, or the predefined push-out position lies between the two support slides and in particular between those regions of the support slides that form a rigid bearing.

It is understood that the workpiece part in the second case is supported by the bearing faces of both support slides. The workpiece part in this case is typically rigid in flexural terms. In particular when the push-out position is chosen to be between the two support slides attention has to be paid that tilting of the workpiece part does not arise when the push-out element is pressed against the workpiece part.

The push-out position is therefore preferably chosen at a point that lies within the bearing polygonal which is formed by the external contour of the workpiece that bears on the bearing faces. The push-out position in this instance is located within the convex envelope of the partial areas of the workpiece part that bear on the bearing faces, or on the hard or rigid regions of said bearing faces, and tilting of the workpiece part when pushing-out is avoided. The spacing of the support slides can be optimized in particular in the case of complex workpiece parts having many or large internal openings, so that the convex envelope of the workpiece partial areas that bear on the support slides or on the hard regions, is modified and a suitable push-out position can be found within the convex envelope. The convex envelope of the workpiece part herein is defined as is generally commonplace in mathematics.

A further aspect of the invention relates to a method for pushing out a workpiece part that has been cut-free from a (residual) workpiece, said method being able to be carried out in particular on a machine as has been described above. Said method includes the steps of: moving a push-out element to a predefined push-out position, and pressing the push-out element against the cut-free workpiece part at the predefined push-out position, wherein a push-out position which is offset from the center of area or from the center of mass of the cut-free workpiece part in the direction toward the centroid of said cut-free workpiece part, or coincides with the centroid is predefined in the case of a cut-free workpiece part in which the center of area of the area that is surrounded by an external contour line of the cut-free workpiece, or the center of mass of said cut-free workpiece part, deviates from the centroid of the cut-free workpiece part, or from the centroid of the external contour line.

In the case of said method the push-out position is thus predefined so as to depend on a geometry, in particular on an external contour (line), of the cut-free workpiece part. As has been described above, an optimal push-out position is typically favorable when it is close to a potential problematic location, or close to the most complex location of the external contour. Therefore, the push-out position is chosen to be in that part-region of the workpiece part between the center of area—calculated without taking into account internal contours—or the center of mass and the external contour in which the centroid is located. A push-out position that deviates from the centroid is predefined in particular when no workpiece material but an opening is located at the location of the centroid.

In a further variant, the push-out position is predefined within a convex envelope of those partial areas of the workpiece part which bear on bearing faces (supported areas), in particular on regions of the bearing faces that form a rigid bearing, wherein the bearing faces are lowerable and support the workpiece part against the impact of the push-out element. As has been described above, tilting of the workpiece when pushing out can be avoided when the push-out position is located within the convex envelope of the partial areas of the workpiece part that bear on the bearing faces, or on the hard or rigid regions of said bearing faces.

As has been described above, the push-out element can be mounted in a rigid or a resilient manner, wherein a pretension can be built up in the second case when the workpiece part is supported from below, for example by a support slide, so as to fix the workpiece part when pressed against a support element (for example a support slide).

As has likewise been described above, the push-out element, or the push-out unit, can also be used as a sensor for checking the correct discharging of the workpiece part when the workpiece part is lowered with the aid of the one or the two support slides. Two variants are in principle possible herein, depending on whether the support slides or the bearing faces thereof can be lowered by a distance that is greater than that by way of which the push-out element can be extended, or whether the distance by way of which the push-out element can be lowered corresponds to at least the distance by way of which the support slides or the bearing faces thereof can be lowered.

In the first case, the clamping of the workpiece part between the push-out element and the bearing face of the support slide or support slides during the discharging is maintained until the lower terminal position of the push-out element relative to the workpiece bearing plane has been reached. If the workpiece part has been correctly pushed out from the sheet skeleton, the push-out element in the further lowering of the support slides must remain in the lower terminal position of said push-out element. Should this not be the case, the sheet skeleton having the workpiece part hanging thereon springs back in the further lowering of the support slides, and the push-out element, in as far as the latter is mounted in a resilient manner, departs from the lower terminal position thereof, this being an indication of a defective push-out process. Alternatively, in the case of a push-out element that is mounted in a rigid manner, or is locked in the second position, a pressure sensor can detect the contact between the push-out element and the workpiece part, said contact having to be lost in the further lowering of the support slides beyond the lower terminal position of the push-out element in the case of a correct push-out process.

When the extension length of the push-out element and the lowering length of the support slides below the workpiece bearing face correspond to one another, the discharging procedure can advantageously be designed such that the push-out element after attaining the lower terminal position of the support slides is moved upward by a predefined distance with the aid of the movement axis of the machining head. The push-out element herein must attain the second completely extended position thereof (in the case of a resilient push-out element) or a (pressure) sensor must detect the loss of contact between the push-out element and the surface of the workpiece (in the case of a rigidly mounted push-out element).

For checking whether the workpiece part has been correctly pushed out in the case of a push-out element that is mounted in resilient manner in the second position, the attainment of the second completely extended position in the case of the second variant described above, and the departure from the second extended position in the case of the first variant described above, can be detected. As has been described above, the departure from the second position after the attainment of the lower terminal position of the push-out element in the case of the first variant in which the lowering length of the support slides is larger than the extension length of the push-out element provides an indication of an incorrect push-out. In the second variant in which the lowering length corresponds to the extension length, in the above-described movement of the push-out element from the lower terminal position it can be checked, with the aid of the upward movement axis of the machining head, whether the second position is attained. If this is not the case, this is likewise an indication of an incorrect push-out.

In cases of doubt, the push-out element, for example in the form of a piston rod, that is located in the second position can be moved within the hole in the sheet skeleton that has been left behind in the workpiece by the workpiece part. If the second position of the push-out element changes during this movement in the case of a resiliently mounted push-out element, this means that material is still located at this location and the workpiece part has not been completely removed from the sheet skeleton.

In one further variant the method includes the following steps: lowering the bearing face of the at least one support slide and/or of the support slide itself below a workpiece bearing plane that is formed by the workpiece bearing faces, wherein the push-out element during lowering is pressed against the cut-free workpiece part at the predefined push-out position so as to fix the cut-free workpiece part, when lowered, in a horizontal position on the bearing face of the at least one support slide and so as to prevent any catching or canting.

Further advantages of the invention are derived from the description and from the drawings. Likewise, the above-mentioned features and those yet to be set forth can be used individually or in multiple combinations with one another. The embodiments shown and described are not to be understood as an exhaustive enumeration but rather have an exemplary character in order for the invention to be visualized.

Identical reference signs are used for the same components, or for components of equivalent function in the following description of the drawings.

DETAILED DESCRIPTION

Figure 1:
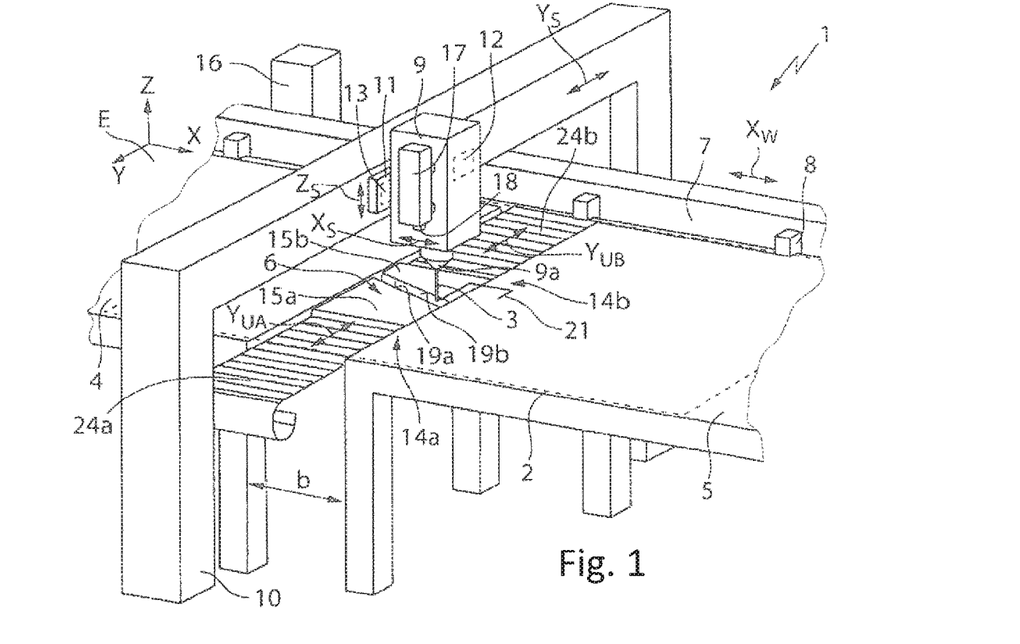
FIG. 1 shows an illustration of a machine for laser processing, having two stationary workpiece bearing faces between which a gap that extends in the Y-direction and in which two support slides as well as a machining head having a push-out unit are movable is formed.

FIG. 1 shows an exemplary construction of a machine 1 for laser processing, more specifically for laser cutting, of a plate-shaped workpiece 2 (illustrated in dashed lines) by means of a processing beam in the form of a laser beam 3. In order for the workpiece 2 to be cut, another type of thermal processing beam, for example a plasma jet or a water jet, can also be used instead of the laser beam 3. Alternatively, the machine 1 can also be configured for mechanically separating the workpiece 2, for example as a punching machine or as a combined punching/laser machine.

The workpiece 2 when processed bears on two stationary workpiece bearing faces (or workpiece bearing supports) 4, 5 which in the example shown form the upper sides of two workpiece tables and define a workpiece bearing plane E (X-Y plane of a XYZ coordinate system) for bearing the workpiece 2. The workpiece bearing faces 4, 5 can be formed by table faces or by pin-shaped bearing elements (pins), bearing belts, brushes, rollers, balls, air cushions, or the like.

The workpiece 2 by means of the conventional movement and holding unit 7 that has a drive and clamping units 8 in the form of clamping jaws for fixedly holding the workpiece 2, can be displaced in a controlled manner in a first direction X (hereunder: X-direction) on the workpiece bearing faces 4, 5 and be moved to a predefined workpiece position $X_W$. In order for the movement of the workpiece 2 in the X-direction to be facilitated, brushes, balls, or sliding rollers which represent the actual workpiece bearing faces 4, 5 can be attached to the workpiece tables shown in FIG. 1. Alternatively, in order for the workpiece 2 to be moved in the X-direction, or in order for said movement of the workpiece 2 to be supported, it is possible for example for the workpiece bearing faces 4, 5 to be designed as a movement unit, for example in the form of a (revolving) conveyor belt as is described in the patent application DE 10 2011 051 170 A1 of the applicant, or in the form of a workpiece bearing as is described in JP 06170469.

A gap 6 which is laterally delimited by the stationary workpiece bearing faces 4, 5 is formed between the two stationary workpiece bearing faces 4, 5. The gap 6 extends in a second direction (hereunder: Y-direction) across the entire width of the two workpiece bearing faces 4, 5. A laser cutting head 9 which aligns and focuses the laser beam 3 onto the workpiece 2 is displaceable in a controlled manner in the Y-direction by means of a driven slide 11 which serves as a movement unit/drive and which is guided on a stationary gantry 10. The laser cutting head 9 in the example shown is additionally also displaceable in the X-direction and, with the aid of an additional movement unit 12, for example in the form of a linear drive that is attached to the slide 11, can also be relocated in a controlled manner in the X-direction.

The laser cutting head 9 with the aid of the mutually complementary movement units 11, 12 can be positioned both in the X-direction as well as in the Y-direction at a desired cutting head position $X_s$, $Y_s$ within the gap 6. Additionally, the laser cutting head 9 in the example shown, by means of a fourth movement unit 13 which is complementary to the second movement unit 11, can be moved along a third movement direction Z (direction of gravity, hereunder: Z-direction) so as to set the spacing between a machining nozzle 9a of the laser cutting head 9 and the surface of the workpiece 2, or so as to position the laser cutting head 9 at a desired cutting head position $Z_s$ relative to the workpiece bearing plane E in the Z-direction, respectively.

Two support slides 14a, 14b, which are shown in a plan view in FIG. 2, are disposed in the gap 6 shown in FIG. 1 in order to additionally support the workpiece 2 and in order to support workpiece parts 20 that are cut during separative machining. The two support slides 14a, 14b extend in each case across the entire width b of the gap 6 and are displaceable in a controlled and mutually independent manner in the Y-direction in the gap 6. The control movement of the support slides 14a, 14b along the lateral edges 4a, 5a of the stationary workpiece bearing faces 4, 5 can be performed with the aid of spindle drives, for example, where the spindle nut is attached to the respective support slide 14a, 14b and the spindle as well as the drive motor are attached to one of the two stationary workpiece bearings 4, 5. It is understood that the control movement of the support slides 14a, 14b can also be implemented in other ways.

The support slides 14a, 14b in the gap 6 can in each case be moved along the second direction Y to a desired position $Y_UA$, $Y_UB$, so as to there support the workpiece 2 as well as workpiece parts 20 that are to be cut-free from the workpiece 2, or have been cut when machining, respectively, by means of a bearing face 15a, 15b that is attached to the respective support slide 14a, 14b. In the case shown, the bearing face 15a, 15b of a respective support slide 14a, 14b in the Z-direction terminates so as to be flush with the workpiece bearing faces 4, 5, that is to say that the bearing faces 15a, 15b of the support slides 14a, 14b are located in the bearing plane E for the workpiece 2.

The movement of the support slides 14a, 14b can be performed in a synchronous manner, that is to say that the spacing between the position $Y_{UA}$ of the first support slide 14a and the position $Y_{UB}$ of the second support slide 14b in the second direction Y is constant during the movement. The movement of the first support slide 14a can also be performed independently of the movement of the second support slide 14b, that is to say that the spacing between the position $Y_{UA}$ of the first support slide 14a and the position $Y_{UB}$ of the second support slide 14b varies during the movement along the second direction Y.

In the example shown in FIG. 1, in each case one covering element 24a, 24b for covering the gap 6 between the two workpiece bearing faces 4, 5 is attached to the lateral edges of the bearing faces 15a, 15b of the support slides 14a, 14b, said lateral edges running in the X-direction and facing away from one another. The covering elements 24a, 24b extend across the entire width b of the gap 6, are conjointly moved in the movement of the support slides 14a, 14b in the Y-direction, and in the example shown are configured in the manner of roller shutters. The covering elements 24a, 24b can also be configured in another manner, for example so as to be telescopic, imbricated, as a rolled-up belt, etc. The upper side of the covering elements 24a, 24b are located so as to be level with the bearing faces 15a, 15b of the support slides 14a, 14b, or of the workpiece bearing faces 4, 5, respectively. The covering elements 24a, 24b serve for bearing part-regions of the (residual) workpiece 2 which protrude into the gap 6 and are not rigid in flexural terms and which without such a bearing could potentially collide with the support slides 14a, 14b.

For controlling the separative machining the machine 1 has a control unit/controller 16 which serves for coordinating the movements of the workpiece 2, of the laser cutting head 9, and of the support slides 14a, 14b, so as to set a desired workpiece position $X_W$, a desired cutting head position $X_S$, Ys, $Z_S$, and a desired position $Y_{UA}$, $Y_{UB}$ of the support slides 14a, 14b, in order for the cutting of a predefined cutting contour 21 and in order for the workpiece 2 to be adequately supported. The control unit 16 in the example shown also serves for controlling a push-out unit 17 which is fastened laterally to the laser cutting head 9 and which is configured in the form of a push-out cylinder that has a piston rod that serves as a push-out element 18 for pushing-out cut-free workpiece parts, as will be described hereunder by means of FIGS. 2A, B and FIGS. 3A-F.

FIGS. 2A-D show the gap 6 extending in the Y-direction, having the two stationary workpiece bearing faces 4, 5, of which the mutually facing lateral edges 4a, 5a are aligned so as to be parallel with the Y-direction. When cutting free a workpiece part 20 along the cutting contour or external contour 21, which in the example shown in FIGS. 2A, B runs parallel with and orthogonal to the X-direction, said workpiece part 20 can be in a position that when it is completely severed from the residual workpiece at a cutting-free position FP, the workpiece part 20 bears only on the bearing face 15b of one of the two support slides 14b. For example said workpiece part 20 is supported only in the part-regions (supported areas) of the bearing face 15b of the second support slide 14b that is illustrated in hatched manner in FIG. 2A. It is understood that a similar situation can also arise when, instead of the two support slides 14a, 14b shown in FIGS. 2A. B, only a single support slide, for example only the second support slide 14b, is disposed in the gap 6.

A majority of the workpiece parts 20 that are cut free from the workpiece 2 typically have approximately rectangular external dimensions and, if present, internal contours which are aligned at an angle of 0° or 90° in relation to the external edges of the workpiece 2. In order for workpiece parts 2 that have long tongue-shaped part-regions that extend in the X-direction or in the Y-direction to be better supported, the two mutually facing and parallel lateral edges 19a, 19b of the bearing faces 15a, 15b of the two support slides 14a, 14b are aligned so as to be oblique in the case of the example shown in FIGS. 2A-D, that is to say that said lateral edges 19a, 19b are aligned at an angle $\alpha_x$ in relation to the X-direction. As can be seen in FIG. 2B, such an oblique alignment of the edges 19a, 19b can also be favorable in the case of a workpiece part 20 which has a rectangular geometry since said workpiece part 20 on account of the oblique alignment of the edges 19a, 19b bears on the bearing faces 15a, 15b of both support slides 14a, 14b, as is indicated in FIG. 2B by the partial areas 27a, 27b that are illustrated in a hatched manner. In this case, the push-out position AP can be chosen to be between the two support slides 15a, 15b, as is illustrated in FIG. 2B. The angle $\alpha_x$ which is enclosed by the two edges 19a, 19b of the bearing faces 15a, 15b and by the X-direction is between approximately 20° and 40°, for example, between 25° and 35°, or approximately 30°.

Figure 2A:
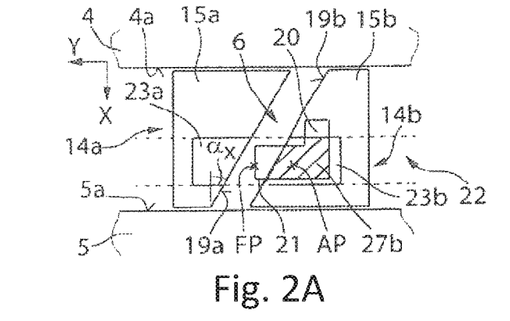
FIGS. 2A-D show illustrations of the two support slides of FIG. 1, the mutually facing edges of said support slides being aligned at an angle in relation to the X-direction, wherein the two support slides on the mutually facing edges thereof have in each case one region that forms a rigid bearing, or in which that region that forms the rigid bearing forms the entire bearing face.
Figure 2B:
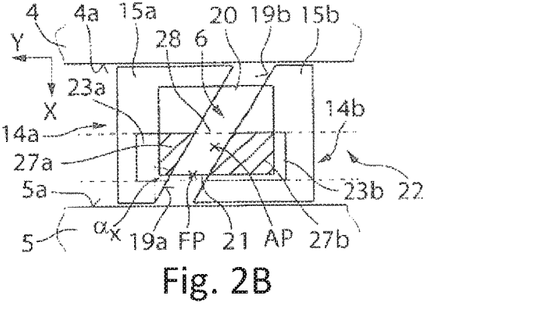

FIGS. 2A, B show the movement range 22 of the laser cutting head 9 in the X-direction, that is to say those cutting head positions $X_s$ at which the laser beam 3 can be positioned by displacing the laser cutting head 9 in the X-direction. As can likewise be seen in FIGS. 2A, B the width b of the gap 6 is more than double the size of the extent of the movement range 22 of the laser cutting head 9 in the X-direction; however it is of course also possible for the movement range 22 in the X-direction to have a larger extent.

Two regions 23a, 23b of the bearing faces 15a, 15b which are disposed so as to neighbor the edges 19a, 19b and which form a rigid bearing for the workpiece 2, or for the cut-free workpiece part 20, respectively, are shown in FIGS. 2A, B. The regions 23a, 23b which form the rigid bearing are formed from a hard (solid) material, for example from copper, such that said regions 23a, 23b can serve as counter bearings for the push-out element 18 that at a push-out position AP, which is shown in FIGS. 2A, B and is located within the respective region 23a, 23b, is pressed against the cut-free workpiece part 20. The bearing face 15a, 15b of a respective support slide 14a, 14b outside the region 23a, 23b that forms the rigid bearing, can be configured as a brush bearing, for example, which supports the workpiece 2, or the workpiece part 20, respectively, bearing thereon in a scratch-free manner, as is illustrated in FIGS. 2A, B. Alternatively, the entire bearing face 15a, 15b can also form a region 23a, 23b that forms a rigid bearing, as is illustrated in FIGS. 2C, D.

In the case illustrated in FIG. 2A, a push-out position AP that is located in the hatched part-region of the workpiece part 20, which is located in the rigid region 23b of the bearing face 15b of the second support slide 14b, is chosen. In the case illustrated in FIG. 2B, the push-out position can also be chosen so as to be between the support slides 14a, 14b. In order to avoid any tilting of the workpiece part 20, the push-out position AP should meet the criterion that said push-out position AP lies within the convex envelope of those partial areas 27a, 27b of the workpiece part 20 that bear on the rigid regions 23a, 23b of the bearing faces 15a, 15b. The push-out position AP within the convex envelope of said partial areas 27a, 27b is predefined by the control unit 16 in a manner which will be described in more detail below.

Figure 2C:
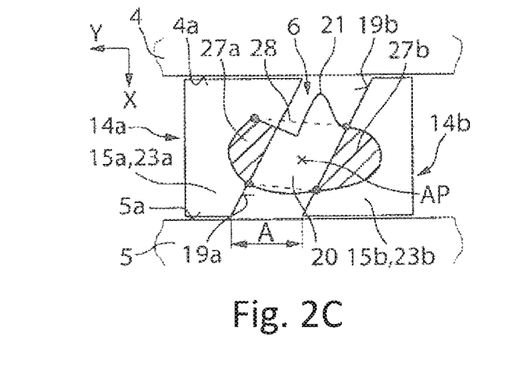
Figure 2D:
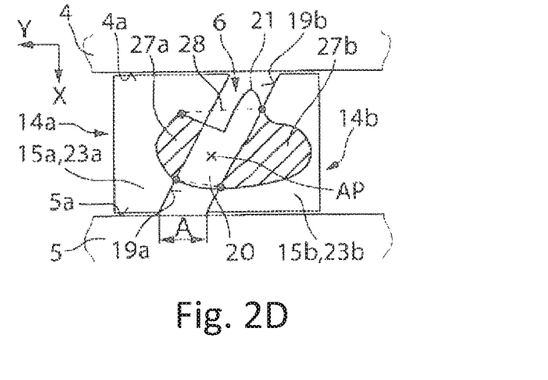

FIGS. 2C, D by means of a workpiece part 20 which has complex external contour 21 illustrate the concept of the convex envelope 28 of those two partial areas 27a, 27b of the workpiece part 20 that bear on the bearing faces 15a, 15b of the two support slides 14a, 14b. As opposed to the support slides 14a, 14b illustrated in FIGS. 2A, B, the entire bearing face 15a, 15b in the case of the support slides 14a, 14b shown in FIGS. 2C, D forms a region 23a, 23b that forms a rigid bearing. As can be seen in the case of the workpiece part 20 shown in FIGS. 2C, D the convex envelope 28 varies depending on the spacing A between the two support slides 14a, 14b in the Y-direction. Therefore, the convex envelope 28 of the workpiece part 20 prior to the pushing out by means of the push-out element 18 can be adapted by varying the spacing A in the Y-direction between the two support slides 14a, 14b in such a manner that a suitable optimal push-out position AP is found within the convex envelope 28.

The pushing-out of the cut-free workpiece part 20 shown in FIG. 2A with the aid of the push-out element 18 can be performed, for example, in the manner described hereunder in conjunction with FIGS. 3A-F.

Figure 3A:
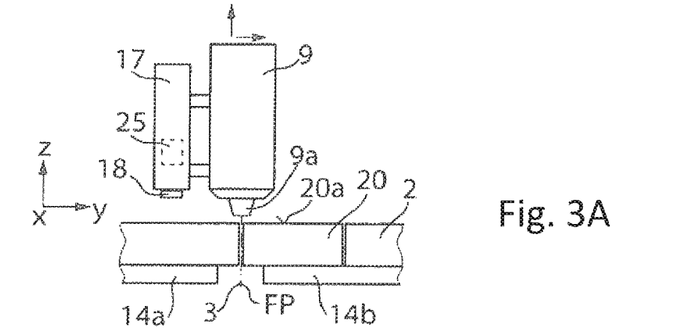
FIGS. 3A-F show illustrations of a plurality of steps of a method for pushing-out a workpiece part that is cut-free from the sheet skeleton with the aid of a push-out element of the push-out unit.
Figure 3B:
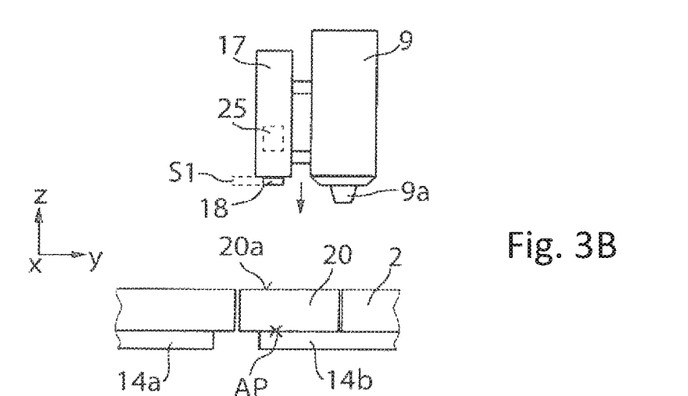

FIG. 3A shows the laser cutting head 9 when cutting free the workpiece part 20 shown in FIG. 2A by means of the laser beam 3, in which the workpiece part 20 is supported by the two support slides 14a, 14b. After the laser beam 3 has been switched off, the laser cutting head 9 with the aid of the second movement unit 11 is moved in the Y-direction and with the aid of the movement unit 12 is moved in the X-direction within the gap 6 until the push-out element 18 is positioned above the push-out position AP, as is illustrated in FIG. 3B.

Figure 3C:
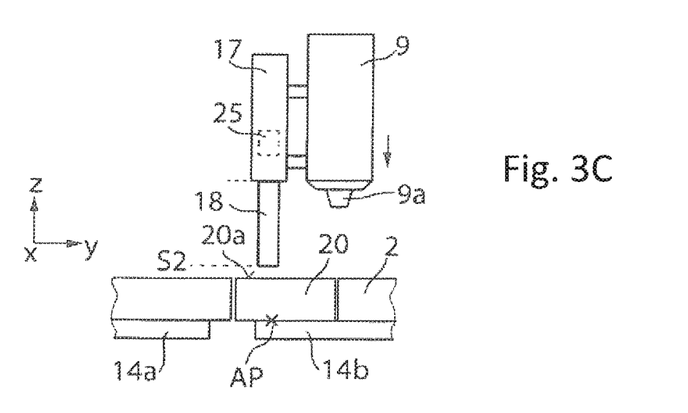

The laser cutting head 9 and thus also the push-out unit 17 (hereunder also referred to as the push-out cylinder) with the aid of the fourth movement unit 13 are simultaneously displaced upward in the Z-direction so as to enlarge the spacing from the upper side 20a of the cut-free workpiece part 20, or from the (residual) workpiece 2, respectively. The laser cutting head 9 herein is displaced upward so far that the push-out element 18 can be displaced from a first retracted position S1 which is shown in FIG. 3B and in which the push-out element 18 (hereunder also referred to as the piston rod) does not project downward beyond the laser cutting head 9, more specifically beyond the machining nozzle 9a, to a second extended position S2 which is shown in FIG. 3C and in which the push-out element 18 projects beyond the machining nozzle 9a.

The push-out element 18, configured as a piston rod, of the push-out cylinder 17 is displaced by means of an actuator from the first upper position S1, which forms an upper terminal position, to the second lower position S2, which forms a lower terminal position of the push-out element 18. The push-out cylinder 17 in the example shown is a pneumatic cylinder that is supplied with a working gas in order for the piston rod 18 to be displaced. The push-out cylinder 17 can serve as a gas spring, that is to say the piston rod 18 in the second position S2 can be pushed upward counter to a spring force when said spring force is placed onto the upper side 20a of the cut-free workpiece part 20 and presses against the latter. Alternatively, a motorized drive which causes a displacement of the push-out element 18 by way of a shaft, for example, can serve as an actuator. In this case, the push-out element 18 is typically locked or actuated, respectively, in the second position S2 such that said push-out element 18 cannot be displaced upward from the second position S2, that is to say in the direction toward the first position S1.

Figure 3D:
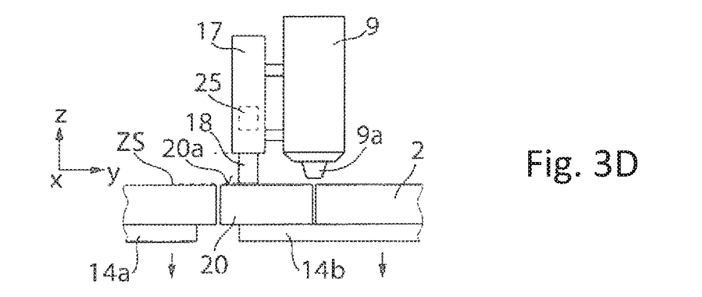
Figure 3E:
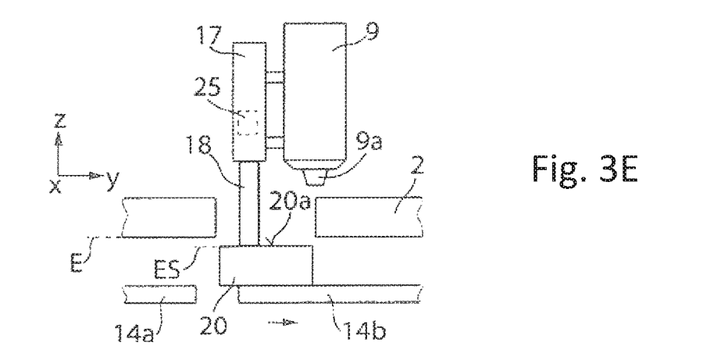

The machining head 9 in the example shown is displaced downward until the piston rod 18 of the push-out cylinder 17 presses against the upper side 20a of the cut-free workpiece part 20. The piston rod 18 herein is forced back from the second position S2 shown in FIG. 3C to an intermediate position ZS which is shown in FIG. 3D and which is displaced in the direction toward the first position S1 relative to the second position S2. On account of the pressure which is exerted by the piston rod 18 in the intermediate position ZS on the cut-free workpiece part 20 the latter is pushed out from the (residual) workpiece 2 when the two support slides 14a, 14b are lowered downward from the workpiece bearing plane E, as is illustrated in FIG. 3E.

The intermediate position ZS is chosen such that the piston rod 18 in the synchronous lowering of the two support slides 14a, 14b below the workpiece bearing plane E can be extended so far that said piston rod 18 still presses against the upper side 20a of the cut-free workpiece part 20 also in the lower terminal position of the support slides 14a, 14b, shown in FIG. 3E, and fixes the workpiece part in the horizontal position thereof. Alternatively or additionally, the machining head 9 in the lowering of the support slides 14a, 14b can be conjointly (in particular in a synchronous manner) lowered by a specific distance so as to maintain the tension applied by the piston rod 18 in the intermediate position ZS in relation to the workpiece part 20.

Figure 3F:
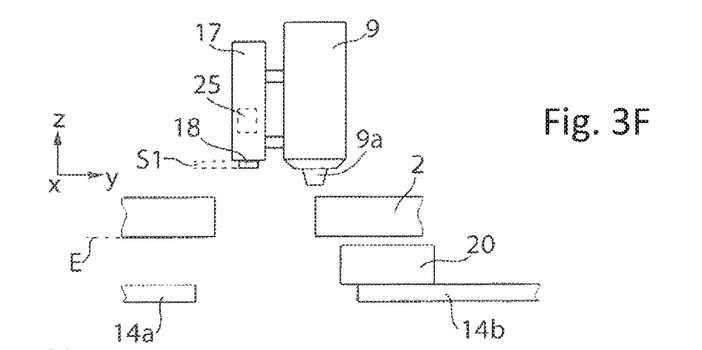

As soon as the support slides 14a, 14b have reached the lower terminal position thereof, the piston rod 18 can be moved back from the lower terminal position ES thereof to the first position S1, as is shown in FIG. 3F.

In order to be discharged, the cut-free workpiece part 20 can be moved below the workpiece bearing plane E in the gap 6 in that the second support slide 14b is displaced in the Y-direction until a discharging position (not shown) is reached in which the cut-free workpiece part 20 is discharged downward, for example in that the second support slide 14b under the cut-free workpiece part 20 is moved away so fast that the latter drops down. After the discharging of the cut-free workpiece part 20, the support slides 14a, 14b are displaced to a suitable position $Y_{U1}$, $Y_{U2}$ in the gap 6 so as to continue the separative machining of the workpiece 2. Alternatively, the cut-free workpiece part can also be discharged downward without any prior lateral movement.

In order to check whether the cut-free workpiece part 20 has been completely pushed out from the residual workpiece 2, the push-out cylinder 17 has a sensor 25 which can be configured, for example, as a path sensor and which determines the position of the push-out element 18 relative to the lower end of the push-out cylinder 17. In the example shown in FIG. 3E, the push-out element 18 in the lower terminal position of the support slides 14a, 14b is located in a lower terminal position ES which in relation to the second position S2 is retracted in the direction toward the lower end of the push-out cylinder 17.

If the push-out element 18 is now moved upward by displacing the laser cutting head 9 by a predefined distance, the push-out element 18 in the case of a correctly discharged workpiece part 20 moves to the second position S2, that is to say that the push-out element 18 reaches the lower terminal position S2 thereof relative to the push-out cylinder 17. The attainment of the second position S2 can be detected with the aid of the path sensor 25 and indicates a correct push-out of the workpiece part 20. If the workpiece part 20 is not correctly pushed out, the second position S2 is not attained in the upward movement of the laser cutting head 9 by the predefined distance.

If a push-out element 18 that is driven by a motor and is rigidly mounted in the second position S2 is used instead of a resiliently mounted push-out element 18, the sensor 25 can be configured as a pressure sensor. By way of the pressure sensor it is detected whether the contact between the workpiece surface 20a of the workpiece part 20 and the push-out element 18 is lost in the upward movement of the laser cutting head 9 in the Z-direction. If this is not the case after a specific predefined distance, this indicates that the workpiece part 20 is still located in the residual workpiece 2.

As opposed to what is illustrated in FIG. 3E, in the case of the two support slides 14a, 14b being able to be lowered so far that the contact between the workpiece upper side 20a of the workpiece part 20 and the push-out element 18 is lost when lowered, the loss of contact in the case of a rigidly mounted push-out element 18 can thus be detected with the aid of the pressure sensor 25, indicating a correct push-out of the workpiece part 20.

If the push-out element 18 is resiliently mounted, in the case of the support slides 14a, 14b being able to be lowered beyond the lower terminal position ES, or beyond the second position S2, it can be detected with the aid of the path sensor 25 whether after the attainment of the position S2 the latter in the downward movement is again departed: if the workpiece part 20 is not correctly pushed out, the residual workpiece 2 conjointly with the workpiece part 20 hanging thereon springs back in the further lowering of the support slides 14a, 14b, and the push-out element 18 departs from the second position S2. The departure from the second position S2 thus indicates a defective push-out procedure.

In cases of doubt, the push-out element 18 in the form of the piston rod that is located in the second position S2 can be moved within the hole in the residual workpiece 2 that has been left behind by the workpiece part 20 in the workpiece 2. If the second position S2 of the push-out element 18 in the case of a resiliently mounted push-out element 18 is departed from in this movement, this means that material is still located at this location and the workpiece part 20 has not been completely removed from the residual workpiece 2.

Figure 4:
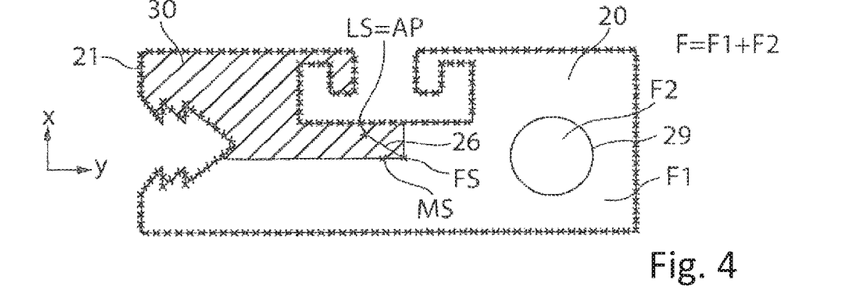
FIG. 4 shows an illustration of a cut-free workpiece part and of the center of area, the center of mass, and the centroid of said cut-free workpiece part, wherein said centroid coincides with a push-out position.

By means of FIG. 4 it will be explained hereunder in which manner the control unit 16 predefines or determines, respectively, an optimal push-out position AP for a workpiece part 20 having a non-symmetrical external contour 21. The workpiece part 20 shown in FIG. 4 has a substantially rectangular geometry in which two clearances and one circular internal contour 29 are formed. The workpiece part 20 by virtue of the comparatively complex geometry thereof has a center of area FS and a center of mass MS, both deviating from a centroid LS of the external contour 21 of the workpiece part 20. The center of area FS is calculated without taking into account the internal contour 29, thus as if the workpiece part 20 would not have the internal contour 29; that is to say that the entire area F that is surrounded by the external contour 21, that is to say both the area F1 outside the internal contour 29 as well as the area F2 within the internal contour 21 (F=F1+F2) is used for the calculation of the center of area FS. The centroid LS of the external contour 21 of the workpiece 20 can be visualized in that a multiplicity of points with identical spacing, identified by crosses in FIG. 4, are placed or defined, respectively on the external contour 21. The mean value of the X-positions or the Y-positions, respectively, of the points along the external contour 21 forms the centroid LS of the workpiece part 20.

The centroid LS is generally, that is to say not only in the case of the workpiece part 20 shown in an exemplary manner in FIG. 4, displaced from the center of area FS, or from the center of mass MS, in the direction toward the complex part-regions of the workpiece part 20. The friction of the workpiece part 20 when pushed out from the residual workpiece 2 is particularly high at the complex part-regions of the workpiece part 20, such that said part-regions represent potential problematic locations for the push-out.

It is favorable for the push-out position AP to be chosen or predefined so as to be close to problematic locations of this type, so as to increase the force effect on the complex part-regions of the workpiece part 20 by way of a shortened lever arm. It is in particular favorable to choose the centroid LS as the push-out position AP, as is shown in FIG. 4. Alternatively, the push-out position AP can be chosen so as to be offset from the center of mass MS or from the center of area FS of the workpiece part 20 in the direction toward the centroid LS, preferably so as to be close to the centroid LS, that is to say so as to generally lie in a part-region 30 of the workpiece part 20 between the center of area FS or the center of mass MS and the external contour 21, the centroid LS also being located in said part-region 30. Said part-region 30 to which the push-out position AP is offset is shown in a hatched manner in FIG. 4 can be determined with respect to the centroid FS: the X-position and the Y-position of the centroid FS have been chosen as the delimitation of said part-region 30 in the X-direction and the Y-direction.

In particular, a push-out position AP which lies along the connection line 26 shown in FIG. 4, between the centroid LS and the center of area FS, or a connection line between the centroid LS and the center of mass MS can be chosen. An offset of the push-out position AP in relation to the centroid LS can be purposeful, for example, when a clearance or an opening in the workpiece part 20 is formed at the centroid LS, such that the push-out element 18 cannot engage on the centroid LS. The push-out position AP in this case can in particular be disposed on the nearest point along the connection line 26 at which there is still material of the workpiece part 20. There can also be applications in which the push-out position AP is advantageously chosen so as to be at another location between the centroid LS and the external contour 21 of the workpiece part 20.

In summary, the process reliability when pushing out and discharging workpiece parts 20 can be significantly increased with the aid of the push-out cylinder 17. This applies in particular when an optimized push-out position AP for pressing the push-out element 18 against the workpiece 2 is predefined.

What is claimed is:

1. A machine for separative machining of a plate-shaped workpiece, the machine comprising:

a first movement drive to move the plate-shaped workpiece in a first direction, the first movement drive including a first bearing face configured to bear at least a first part of the plate-shaped workpiece and a second bearing face configured to bear at least a second part of the plate-shaped workpiece;

a machining head configured to cut free a workpiece part from the workpiece such that a center of area of the workpiece part that is surrounded by an external contour line that defines an outer border of the workpiece part deviates from a centroid of the external contour line;

a second movement drive to move the machining head of the machine in a second direction;

two workpiece bearing supports to hold the plate-shaped workpiece, the two workpiece bearing supports being separated from each other by a gap that extends along the second direction between the two workpiece bearing supports;

a push-out piston having a push-out rod, wherein the push-out rod is movable at least in the second direction within the gap to be positioned at a predefined push-out position; and a controller that is configured to arrange components of the machine so that the push-out position either coincides with the centroid of the external contour line that defines the outer border of the workpiece part, or is offset from the center of area of the workpiece part in a direction toward the centroid of the external contour line of the workpiece part.

2. The machine of claim 1, further comprising a third movement drive for moving the machining head in the first direction within the gap, and wherein the push-out piston is movable within the gap by means of the second and the third movement drives.

3. The machine of claim 1, wherein the push-out piston is configured to move the push-out rod between a first retracted position in which the push-out rod does not project beyond an end of the machining head that faces the workpiece, and a second extended position in which the push-out rod projects beyond the end of the machining head that faces the workpiece.

4. The machine of claim 3, wherein the push-out rod in the second position is actuatable or is mounted in a resilient manner.

5. The machine of claim 1, wherein the two workpiece bearing supports hold the plate-shaped workpiece at a workpiece bearing plane, the machine further comprising:
at least one support slide that is displaceable in the second direction within the gap and has a bearing face for supporting the plate-shaped workpiece and the workpiece part that was cut during the separative machining,
wherein at least one of the support slide and the bearing face is movable to a position below the workpiece bearing plane,
wherein the bearing face of the support slide has a region that forms a rigid bearing region, and
wherein the support slide and the push-out rod are positionable relative to one another in such a manner that the push-out position is disposed in the region of the bearing face that forms the rigid bearing region.

6. The machine of claim 5, wherein an extent of the rigid bearing region in the first direction corresponds to an extent of a movement range of the machining head in the first direction.

7. The machine of claim 5, having two support slides that are displaceable within the gap, each of the two support slides having a respective bearing face that has a respective edge, a respective edge of the respective bearing faces mutually facing each other, each of the respective bearing faces having one region that forms a respective rigid bearing region.

8. The machine of claim 7, wherein each of the respective edges of the bearing faces is aligned at an angle in relation to the first direction and to the second direction.

9. The machine of claim 5, wherein the controller is configured to position the push-out rod and the at least one support slide relative to one another in such a manner that the rigid bearing region of the bearing face of the support slide of the at least one support slide is disposed at the push-out position.

10. The machine of claim 5, wherein the controller is configured to position the push-out rod and the at least one support slide relative to one another in such a manner that the push-out position lies between respective rigid bearing regions of two support slides of the at least one support slide.

11. The machine of claim 10, wherein the controller is configured to predefine the push-out position so that the push-out position lies within a convex envelope of supported areas of the workpiece part, the supported areas bearing on respective rigid bearing regions of the bearing faces of the at least one support slide.

12. The machine of claim 1, wherein the push-out piston has at least one sensor that is configured to detect an attainment of a second extended position by the push-out rod.

13. The machine of claim 1, wherein the push-out piston has at least one sensor that is configured to detect any contact between the push-out rod and the surface of the workpiece part.

14. The machine of claim 1, wherein the push-out position is offset along a connection line between the center of area and the centroid of the external contour line.

* * * * *